United States Patent [19]

Ducker, III et al.

[11] Patent Number: 5,328,308
[45] Date of Patent: Jul. 12, 1994

[54] GYRO-STABILIZED TOOL BIT AND WIDE MOUTH TOOL BIT MOUNTING CHUCK

[76] Inventors: Andrew L. Ducker, III, 9604 NW. 28th St., Coral Springs, Fla. 33065; Andrew L. Ducker, Jr., Rte. 6, Box 686, Moorseville, N.C. 28115

[21] Appl. No.: 55,984

[22] Filed: Apr. 29, 1993

Related U.S. Application Data

[63] Continuation-in-part of Ser. No. 998,389, Dec. 30, 1992, abandoned.

[51] Int. Cl.⁵ ............................................. B23B 51/00
[52] U.S. Cl. ..................................... 408/226; 407/30; 51/206 R
[58] Field of Search ........................ 81/54, 438, 439; 279/129, 905; 407/30, 53, 54, 120; 408/199, 226, 241 R; 51/206 R

[56] References Cited

U.S. PATENT DOCUMENTS

| | | | |
|---|---|---|---|
| 2,718,806 | 9/1955 | Clark | 81/438 X |
| 2,809,529 | 10/1957 | Ondeck | 81/54 X |
| 3,734,516 | 5/1973 | Smith | 279/75 |
| 3,735,993 | 5/1973 | Seibert | 279/905 X |
| 3,945,653 | 3/1976 | Falchle | 279/97 |
| 4,483,108 | 11/1984 | Howard | 51/206 R |
| 4,536,108 | 8/1985 | Saxton et al. | 408/226 X |
| 4,692,073 | 9/1987 | Martindell | 408/239 |
| 4,811,843 | 3/1989 | Stribiak | 408/241 R X |
| 4,818,157 | 4/1989 | Kouvelis | 408/240 |
| 4,900,202 | 2/1990 | Weinheld | 408/240 |
| 5,062,749 | 11/1991 | Sheets | 408/240 |
| 5,102,271 | 4/1992 | Hemmings | 408/226 |
| 5,116,172 | 5/1992 | Koster | 408/226 |

FOREIGN PATENT DOCUMENTS 20498 of 1898 United Kingdom ................ 408/226

*Primary Examiner*—Steven C. Bishop
*Attorney, Agent, or Firm*—Frank L. Kubler

[57] ABSTRACT

A tool bit includes a shaft portion having a mounting end for insertion into a bit receiving opening of a chuck, having a working end, and having an average radius and a longitudinal axis, a flywheel portion, between the mounting end and the working end, having an average radius greater than the average radius of the shaft portion and greater than the average radius of the receiving opening of the chuck, and having a center of gravity, the flywheel portion being connected to the shaft portion such that the flywheel portion center of gravity is located substantially on the shaft portion longitudinal axis, the shaft portion, the mounting end and the flywheel portion being joined together as a single unified structure. A chuck for receiving the tool bit includes a receiving tube for receiving the mounting end of the tool bit, a port in the receiving tube for laterally receiving a locking ball, such that the port can align with the depression so that the locking ball can enter the depression, a camming tube having an inner wall and slidably mounted over the receiving tube, comprising a camming portion protruding from the inner wall and comprising a central camming portion recess into which the locking ball can move so that, when the recess aligns with the port, the locking ball can roll out of the depression and into the recess, thereby releasing the tool bit mounting end, the camming portion also comprising a shoulder on one side of the recess for forcing the locking ball to protrude through the port and lock into the depression.

31 Claims, 7 Drawing Sheets

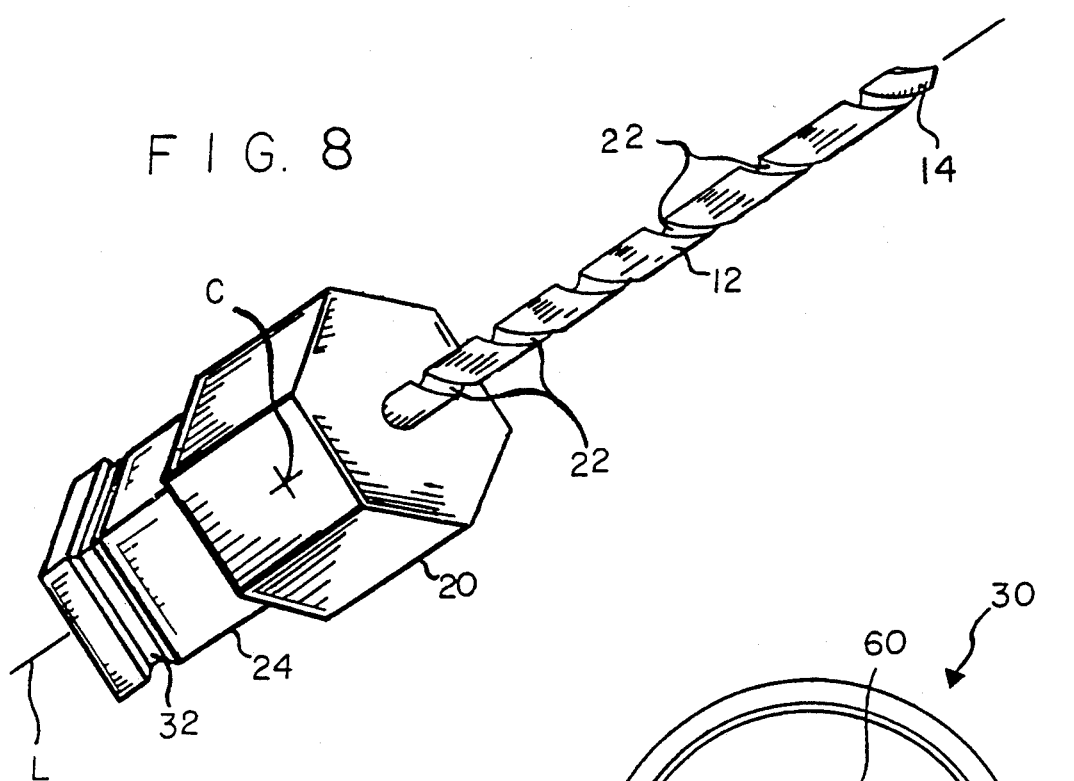
FIG. 8
FIG. 9
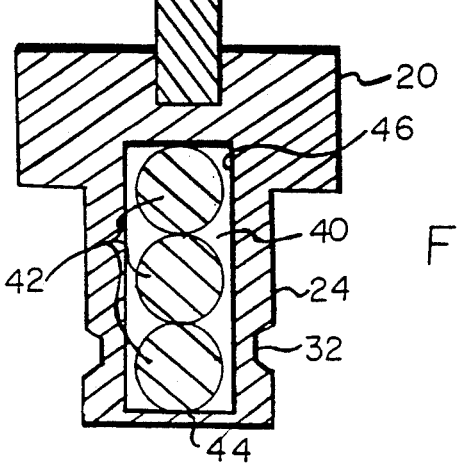
FIG. 10

GYRO-STABILIZED TOOL BIT AND WIDE MOUTH TOOL BIT MOUNTING CHUCK

FILING HISTORY

This application is a continuation-in-part of application Ser. No. 07/998,389, filed on Dec. 30, 1992, now abandoned.

BACKGROUND OF THE INVENTION

1. Field of the Invention

The present invention relates generally to the field of tool bits and tool bit chucks, and more specifically to a tool bit including an elongate shaft having a mounting end and a working end, the mounting end preferably being wide relative to the shaft for increased stability and optionally having an axial bore containing a row of loosely fitting stabilizing balls, a flywheel portion extending radially from the shaft, the flywheel portion preferably being a hexagonal cylinder or disk, the working end taking any of several useful shapes, such as a drill cutting edge, a screw driver head, a reamer or a socket engaging end; and also specifically to a mounting chuck for the tool bit having a square bit receiving tube into which the tool bit mounting end is inserted, ports in opposing tube sides for loosely receiving a locking ball, such that these ports align with a groove in the tool bit mounting end so that the locking balls can enter the groove through the ports, a camming tube which slides over the receiving tube, having a camming portion protruding from its inner wall with a central recess into which the locking balls can retreat when the recess aligns with the ports, to release the bit end, the shoulders of the camming portion on either side of the recess serving to force the locking balls to protrude beyond the receiving tube into the groove to lock the mounting end into the chuck, when one of the shoulders aligns with the ports.

2. Description of the Prior Art

There have long been tool bits and chucks for fast, snap-in and snap-out engagement. A problem with these bits and chucks has been that the snap in engagement, often by cammed balls, is not as tight as a clamping key chuck engagement, and the bit often vibrates and wobbles. Other problems have included chuck bulk, complexity, unreliability, and manufacturing expense.

Wienhold, U.S. Pat. No. 4,900,202, issued on Feb. 13, 1990, discloses a snap-in tool bit and a chuck assembly for the tool bit, intended to prevent undesired tool bit extraction from the chuck. The tool bit itself includes a shank portion with a circumferential engagement groove. The chuck includes a spindle having an axial bore for receiving the shank portion of the tool bit, and radial ports opening into the shank receiving bore which contain detent balls. The balls are cammed radially inward to partially enter the engagement groove by a cam shoulder projection within a spring-biased locking sleeve. The wall of each port are curved inward at their inner ends to retain the balls. All illustrated variations of the shoulder projection have at least one additional step or ramp for bearing against the balls and stopping them from rolling within the curved ports. A problem with the Wienhold tool bit is that the ball engagement does not provide the tight clamping of a key chuck, and no provision is made to compensate for this loss of stability. A problem with the Wienhold chuck is that the curved ball ports must have substantial depth. If they do not, the additional step or ramp for jamming the ball against rotation could cause the balls to roll out of their ports. To make the ports deep, the spindle must be made thick and needlessly heavy and costly in materials. The additional step also raises manufacturing costs.

Sheets, U.S. Pat. No. 5,062,749, issued Nov. 5, 1991, teaches a tool bit and tool coupler similar to that of Wienhold. The Sheets tool bit differs from that of Wienhold in that a radial flange on a shank must be provided for proper interaction with the Sheets chuck, adding expense, while only negligibly increasing radial mass distribution and stability. The Sheets chuck differs from Wienhold in that the cam shoulder portion is narrower and no additional cam step is provided. A problem with the Sheets chuck is that the narrowness of the shoulder portion enhances the potential for unwanted release from accidentally nudging the sleeve. Sheets also differs from Wienhold in that two or more balls may be contained within each port rather than one. Having additional balls in a port merely makes it necessary for the port to be deeper and the spindle thicker and heavier. The two springs and the two diameter axial bore make Sheets complex and expensive. Another problem with the Sheets chuck is that the sleeve must be pushed away from the user for release of the tool bit. Pushing on part of an appliance while holding the appliance is more awkward and difficult than pulling on the part.

Martindell, U.S. Pat. No. 4,692,073, issued on Sep. 8, 1987, teaches another circumferentially grooved tool bit and cammed ball tool chuck with an outer spring-biased sleeve. Rather than positioning a flat cam shoulder over a ball to lock the ball in the tool bit groove, a taper is provided which merely biases the ball radially inward. A problem with Martindell is that the tool bit groove is also tapered or curved. Pulling axially on the tool bit could thus cause the tapered groove to cam the ball back out of the groove and force the sleeve into an unlocked position. In this way, if a tool bit becomes caught during use, pulling on the chuck could unlock the sleeve and leave the tool bit stuck in the work piece. Another problem with the Martindell chuck is that, like the Sheets chuck, the sleeve must be awkwardly pushed away from the user for release tool bit release.

Falchle, U.S. Pat. No. 3,945,653, issued on Mar. 23, 1976, discloses a chuck for securing a tool bit having a shank with a circumferential groove. The chuck includes a spindle having an axial bore for receiving the tool bit shank. The spindle also has a slot on one side into which a cylindrical locking element is laterally positioned. The slot angles through a wall of the spindle, and a sleeve slidingly fits around the spindle, containing a retaining compartment for holding the ends of the locking element. Sliding the sleeve axially relative to the spindle in one direction causes the sleeve retaining compartment to pull the locking element radially outward along the angled slot. When the element is in an outward position, the tool bit shank is free to slide into and out of the axial bore. Moving the sleeve in the opposite axial direction pushes the element radially inward along the angled slot and, if a tool bit shank is in the bore, into the groove to lock the bit in the chuck. A problem with Falchle is that the spindle must be thick and heavy to contain a slot within which the cylindrical element can thus slide. Also, no provision is made to add stability to the tool bit.

Kouvelis, U.S. Pat. No. 4,818,157, issued on Apr. 4, 1989, teaches a quick-change adaptor and tool bit for use with the adaptor. The tool bit has a multi-sided shank portion with a circumferential groove, for fitting into a tubular portion of the adaptor. The adaptor has a shaft portion for fitting into the chuck of a powered rotary tool coaxially attached to the tubular portion. A spring-loaded detent ball is contained within a radial port in the wall of the tubular portion, so that when a tool bit shank portion is fitted into the tubular portion, the ball snaps into the groove to secure the tool bit. A problem with Kouvelis is that the detent ball is biased rather than locked into the groove, and the resulting tool bit engagement is thus unreliable. Another problem is that Kouvelis does not disclose a chuck for permanent installation on a power tool, but merely a small adaptor for use in an existing chuck. Finally, Kouvelis does not compensate for the potential loss in tool bit stability between the chuck and the adaptor and between the adaptor and the tool bit.

Smith, U.S. Pat. No. 3,734,516, issued on May 22, 1973, teaches a chuck assembly for a tool bit adaptor. As in Kouvelis, a tool bit fits into the adaptor and the adaptor fits into a power tool chuck. A problem with Smith is that the chuck is a multi-spring, complicated assembly which would be expensive to manufacture and likely subject to failure. Another problem is once again that stability is lost at multiple couplings and there is no structure to compensate for this loss.

Ondeck, U.S. Pat. No. 2,809,529, issued on Oct. 15, 1957, discloses a screw driver attachment including a tool shank joined at its mounting end to a disk member. The disk member is contained within a housing, and a roller bears against the disk member. A problem with Ondeck if used as a drill tool bit is that there is no mounting end opposite the shank end which could fit into a chuck.

Seibert, U.S. Pat. No. 3,735,993, issued on May 29, 1973, teaches a self-release and reload tooling device. The device includes an adaptor having a threaded bore for receiving a tool shank and having a threaded external surface for receiving an adaptor nut. A problem with Seibert is that the tool bit is screwed into the bore in the adaptor, so that there is limited stiffness between the adaptor and the tool shank, minimizing stability.

Koster, U.S. Pat. No. 5,116,172, issued on May 26, 1992, discloses a composite rotary cutting tool and adaptor, and a method of making them. A problem with Koster is that the tool shank is secured into the adaptor with an adhesive. Since an adhesive can deform and compress, it offers limited shank stiffness and stability.

Hemmings, U.S. Pat. No. 5,102,271, issued on Apr. 7, 1992 and Stribiak, U.S. Pat. No. 4,811,843, issued on Mar. 14, 1989, both teach collet drill bits having depth limiting rings. A problem with both devices is that the rings or gripping collars are apparently of the conventional type described in Stribiak, which are slidably fitted onto the tool shank and are of lighter and softer material than the shank. A light material such as plastic cannot serve as an effective flywheel and the sliding fit does not produce the solid, unified structure important to stability.

Saxton, U.S. Pat. No. 4,536,108, issued on Aug. 20, 1985, discloses a flexible micro-drill bit. Saxton includes a standard, circular mounting end and a reduced-diameter midsection leading to a narrow drill shank for fine work. A problem with Saxton is that it fails to teach a flywheel portion larger than the conventional chuck receiving opening. As a result, any stabilizing effect of the larger mounting end, particularly with a standard size shank, is both very minimal and accidental.

Clark, U.S. Pat. No. 2,718,806, issued on Sep. 27, 1955, reveals a magnetic driving tool having a multi-sided shank and a socket-receiving end structure. Sockets snap over a spring-loaded ball at the outer end of the receiving end structure and against an expanded stop portion. A problem with Clark is that the mounting end of the shank is apparently of conventional chuck opening diameter and thus provides no increased stability.

Schroer, U.S. Pat. No. 20,498, dated Sep. 28, 1898, appears to teach a reamer having a mounting end of smaller diameter than the tool shank itself. This size relationship actually leads to a reduction in stability. An expanded portion is provided, but is only negligibly larger than the tool shank, and thus would have a negligible effect on stability. The expanded portion is apparently intended as a stop rather than as a stabilizer.

It is thus an object of the present invention to provide a tool bit and chuck which permit fast coupling and uncoupling of the tool bit.

It is another object of the present invention to provide such a tool bit and chuck which stabilize the tool bit for smooth operation with minimal vibration.

It is still another object of the present invention to provide such a chuck which has a cammed release sleeve operated by pulling the sleeve toward the appliance on which the chuck is mounted.

It is finally an object of the present invention to provide such a tool bit and chuck which are durable, reliable and relatively inexpensive to manufacture.

SUMMARY OF THE INVENTION

The present invention accomplishes the above-stated objectives, as well as others, as may be determined by a fair reading and interpretation of the entire specification.

An alternative tool bit is provided including a shaft portion having a mounting end for insertion into a bit receiving opening of a chuck, and a working end, and having an average radius and a longitudinal axis, a flywheel portion, between the mounting end and the working end, the flywheel portion having an average radius greater than the average radius of the shaft portion and greater than the average radius of the receiving opening of the chuck, and having a center of gravity, the flywheel portion being connected to the shaft portion such that the flywheel portion center of gravity is located substantially on the shaft portion longitudinal axis; the shaft portion, the mounting end and the flywheel portion being joined together as a single unified structure. The flywheel portion preferably has a certain rotational inertia which is at least half the rotational inertia of the shaft portion, so that the resulting increase in angular momentum is practically significant. The working end may alternatively include a drill cutting edge, a screw driver flat head, a screw driver cross-shaped, pointed tip head, a socket mounting head, or an abrading surface. The mounting end is preferably square in longitudinal cross-section for mounting in a square receiving port of a chuck, for preventing rotational movement of the tool bit relative to the chuck. The mounting end preferably includes a depression for engagement by a cammed engaging member in a drill chuck receiving port. The mounting end preferably has an average radius which is at least twice the average radius of the shaft portion, for increased tool bit stability. The mounting end optionally includes a bore coaxial with the longitudinal axis of the shaft portion, at least one stabilizing ball contained within the bore, the at least one stabilizing ball having a diameter less than that of the bore to permit relative movement between the at least one stabilizing ball and the mounting end, and a retaining structure for preventing the escape of the at least one stabilizing ball from the bore. The mounting end equivalently includes a bore coaxial with the longitudinal axis of the shaft portion, at least one stabilizing cylinder contained within the bore, the at least one stabilizing cylinder having a diameter less than that of the bore to permit relative movement between the at least one stabilizing cylinder and the mounting end, retaining means for preventing escape of the at least one stabilizing cylinder from the bore. The preferred number of stabilizing balls contained within the bore is three. The volume of the bore is preferably essentially half the volume of the mounting end. The preferred combined volumes of the stabilizing balls is preferably essentially half the volume of the bore.

A chuck is provided for receiving a tool bit as described above, including a receiving tube for receiving the mounting end of the tool bit, a port in the receiving tube for laterally receiving a locking ball, such that the port can align with the depression so that the locking ball can enter the depression, a camming tube having an inner wall and slidably mounted over the receiving tube, comprising a camming portion protruding from the inner wall and comprising a central camming portion recess into which the locking ball can move so that, when the recess aligns with the port, the locking ball can roll out of the depression and into the recess, thereby releasing the tool bit mounting end, the camming portion also comprising a shoulder on one side of the recess for forcing the locking ball to protrude through the port and into the depression to lock the tool bit mounting end into the chuck, when the shoulder is aligned with the port. The chuck preferably additionally includes a biasing mechanism for biasing the camming tube in a position wherein the shoulder is aligned with the port.

A tool bit is also provided which includes a shaft portion having a mounting end and a working end and a middle segment connecting the mounting end and the working end, and having an average radius and a longitudinal axis, wherein the shaft portion, mounting end and working end are all joined together as a single unified structure, and wherein the mounting end has an average radius which is at least twice the average radius of the middle segment, for increased tool bit stability.

BRIEF DESCRIPTION OF THE DRAWINGS

Various other objects, advantages, and features of the invention will become apparent to those skilled in the art from the following discussion taken in conjunction with the following drawings, in which:

FIG. 2, except that the working end forms a flat edge wood drill working end.

FIG. 8 is a view as in FIG. 7, except that the working end forms a spiral drill.

FIG. 9 is an end view of the inventive, wide mouth tool bit mounting chuck, showing the wide, square receiving tube, inwardly projecting locking balls, and the mounting screw.

FIG. 10 is a cross-sectional side view of the tool bit of FIG. 8, and having the preferred interior stabilizing ball feature, illustrating three stabilizing balls contained within the mounting end axial bore.

DETAILED DESCRIPTION OF THE PREFERRED EMBODIMENTS

Figure 1:
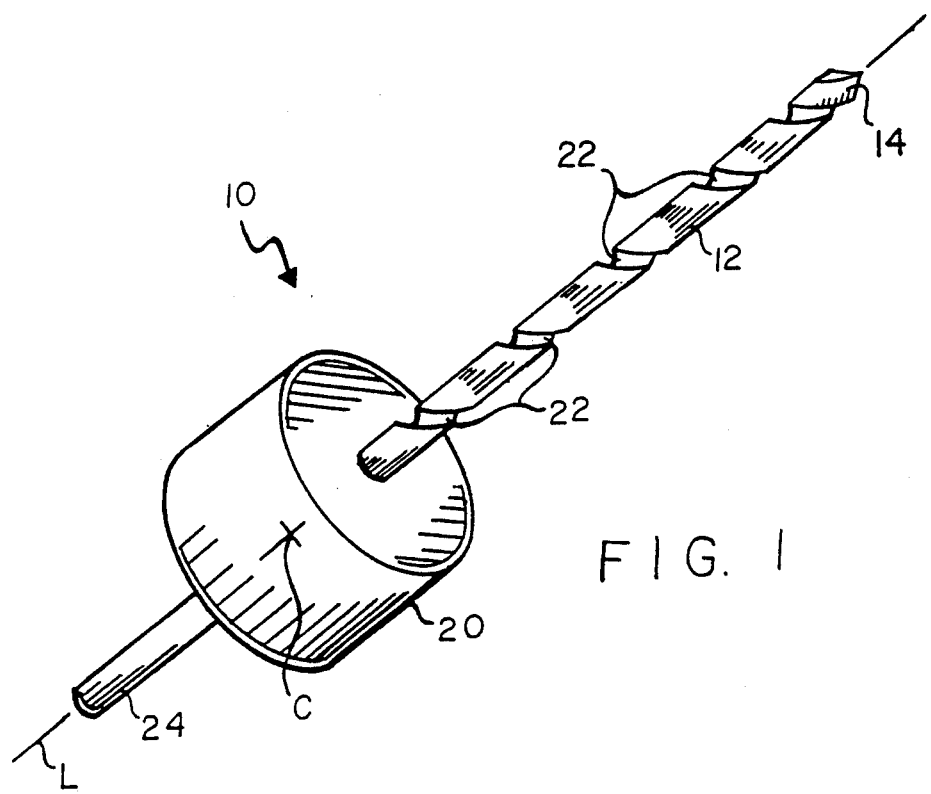
FIG. 1 is a perspective view of one embodiment of the inventive tool bit, having the flywheel stabilizing feature and a spiral drill working end.
Figure 2:
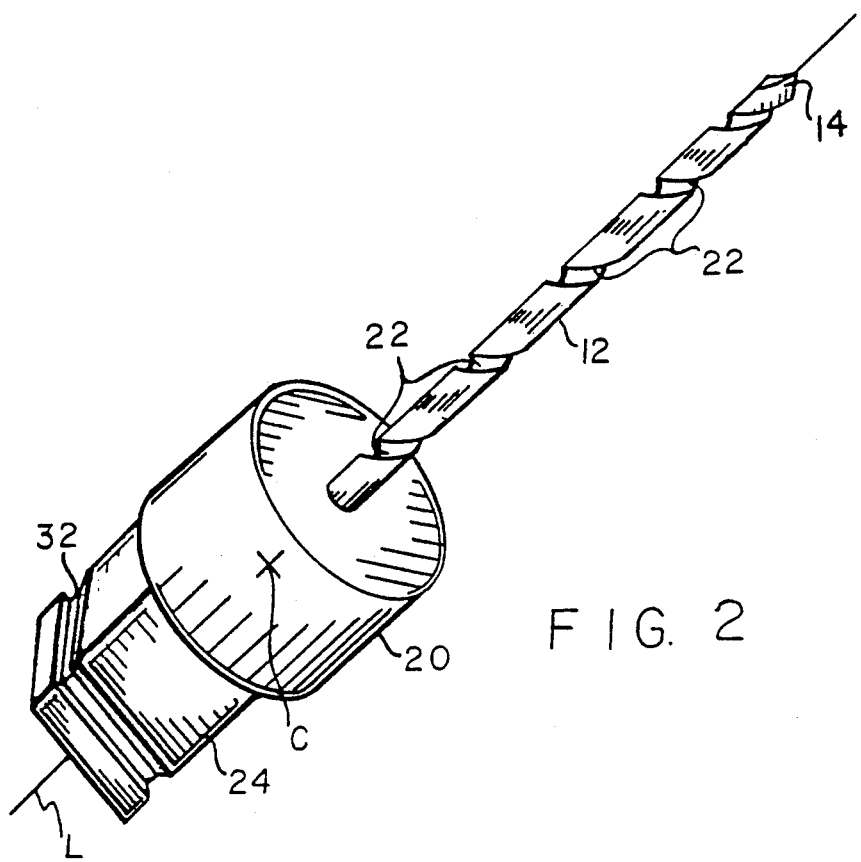
FIG. 2 is a perspective view of the inventive tool bit as in FIG. 1, with the addition of the wide mounting base and locking groove.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Figure 3:
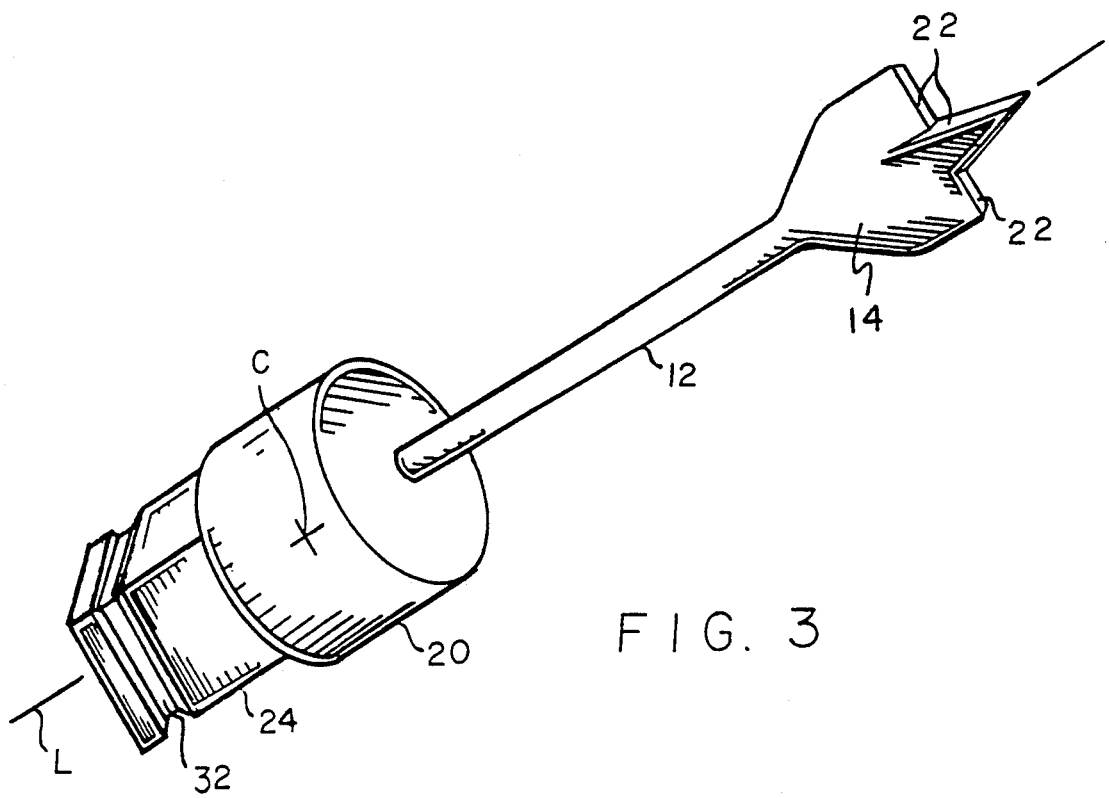
FIG. 3 is a perspective view of the inventive tool bit as in :.
Figure 4:
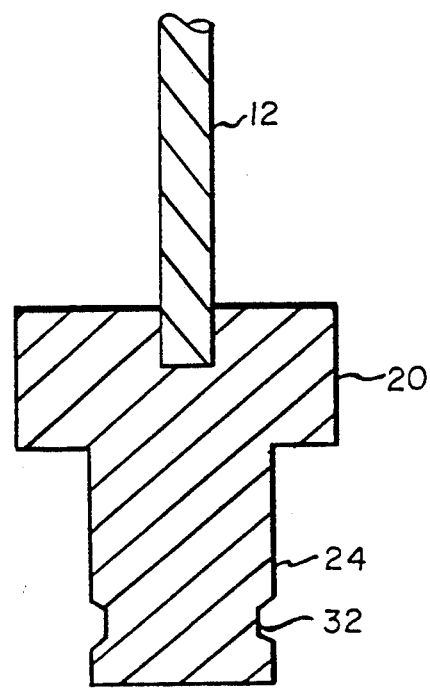
FIG. 4 is a cross-sectional side view of the tool bit of FIGS. 2 and 3.
Figure 10A:
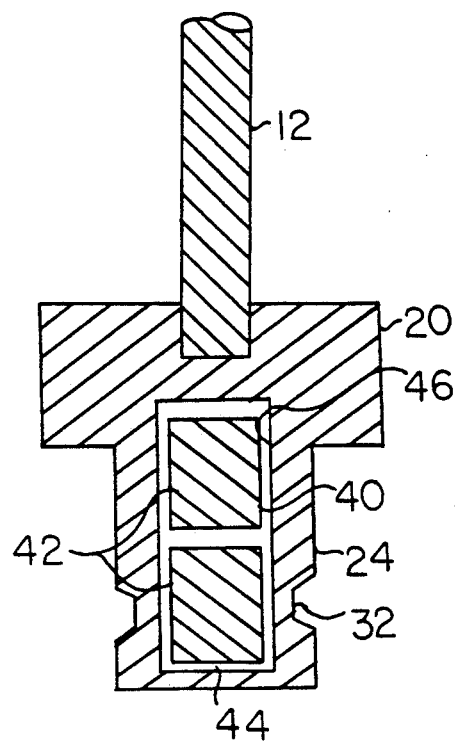
FIG. 10a is a cross-sectional side view as in FIG. 10, illustrating the equivalent stabilizing cylinder option.

Referring to FIGS. 1 through 8 and to FIG. 10, a gyroscopically stabilized tool bit 10 is disclosed. Tool bit 10 includes an elongate shaft 12 having a working end 14 and a mounting end 24, and having a flywheel portion 20 extending radially from shaft 12. Flywheel portion 20 is located between working end 14 and chuck mounting end 24 and includes a heavy material, preferably a metal. See FIG. 4. Working end 14 may include a drill cutting edge 22 of any conventional type, such as the spiral cutting edge 22 of FIGS. 1 and 2. FIG. 3 shows tool bit 10 with a flat drill cutting edge 22. Working end 14 may alternatively include a reamer or an abrading surface, a screwdriver head or socket head. See FIGS. 5-7.

Figure 5:
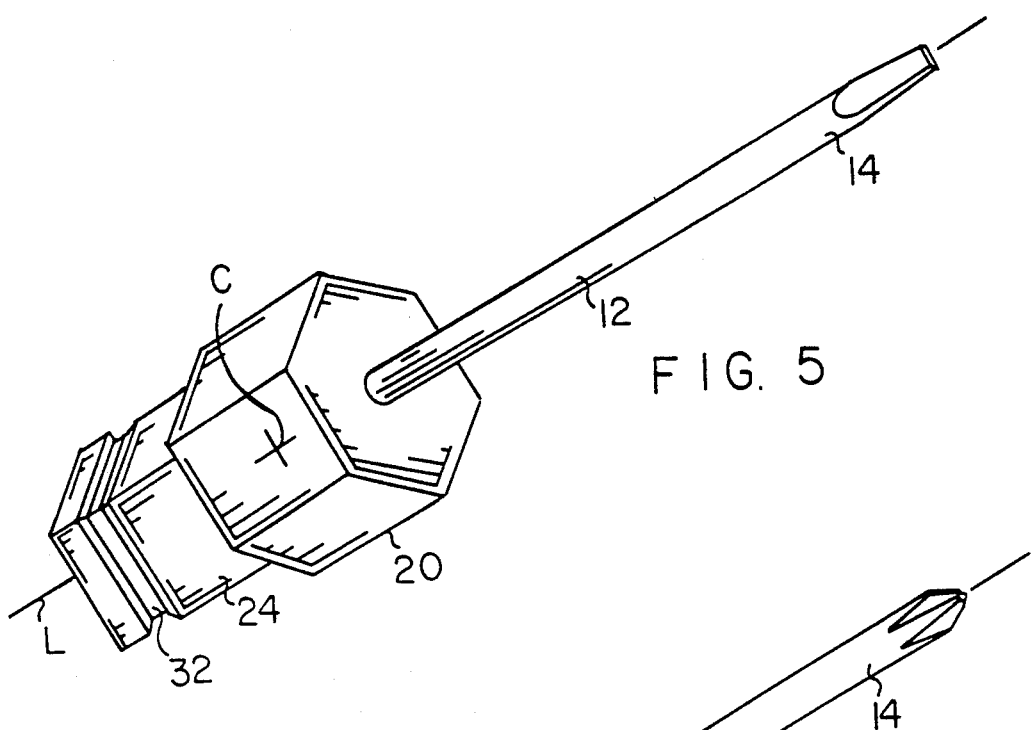
FIG. 5 is a perspective view of the inventive tool bit as in FIG. 2, except that the preferred hexagonal flywheel, and a flat head screw driver working end are provided.
Figure 6:
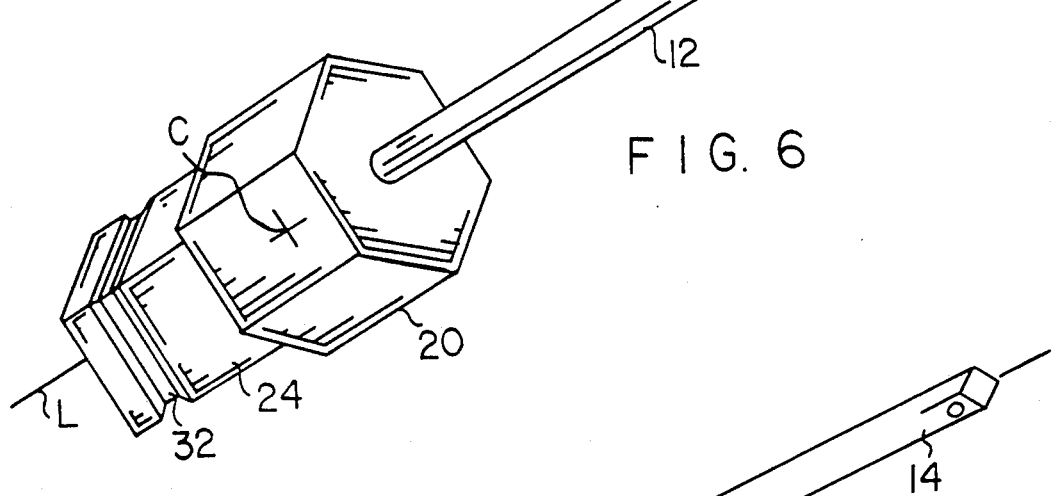
FIG. 6 is a view as in FIG. 5, except that the working end is a cross-shaped, pointed tip screw driver head, commonly known as a PHILLIPS TM screw driver head.
Figure 7:
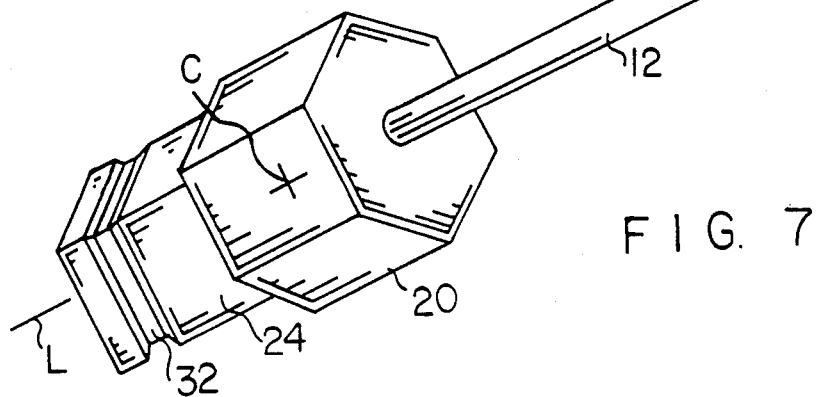
FIG. 7 is a view as in FIG. 6, except that the working end is a square, socket receiving end.

Flywheel portion 20 may be cylindrical or disk shaped, but may take any shape as long as the center of mass C of flywheel portion 20 is located on the longitudinal axis L of shaft 12. The first preferred flywheel portion 20 shape, however, is hexagonal, as shown in FIG. 5. This hexagonal shape for flywheel portion 20 is also the design used for most of the tested prototypes.

Flywheel portion 20 stabilizes bit 10 because it significantly increases the rotational inertia of bit 10, and thus increases its angular momentum. The law of conservation of angular momentum holds that the angular momentum of an object is unchanged unless an external force acts on the object. A force can act on the rotating object to change its angular momentum not only by changing its angular speed, but also by changing its axis of rotation. The resistance offered by the object to the force is directly proportional to the magnitude of the angular momentum of the object. The angular speed taken together with the angle of rotation define a vector quantity known as angular velocity.

The increased resistance to changes in angular speed is beneficial where the density of a work piece varies throughout the drilling. The angular momentum of drill bit 10 carries it steadily through the high density areas with minimal binding.

The increased resistance to changes in the axis of rotation is beneficial because it increases rotational stability and minimizes vibration. It also permits more accurate drilling at a marked point on a work piece, particularly where the point has not been indented with a center punch or similar tool. The reduced need for center-punching can reduce project working time and costs.

The greater the angular momentum of an object, the greater the force required to shift the axis of rotation by a given angle. Thus, if a tool bit is mounted in a chuck with a slight tilt, or is otherwise disposed to wobble or to be laterally deflected by the work piece, the increased angular momentum created by flywheel portion 20 minimizes or eliminates the deflection or wobble.

The increase in rotational inertia, and thus in angular momentum, of drill bit 10 is brought about not only by the added mass of flywheel portion 20, but also by the particular distribution of the mass about axis L. The farther a given mass is distributed from the axis of rotation, the greater the rotational inertia created by that mass. For a disk or cylinder, rotational inertia I is a function of the mass M and the radial distance R of the mass from the rotational axis: $I = \frac{1}{2}MR^2$. Thus, an increase in the radial distance R exponentially increases the rotational inertia I. It is for this reason that the rotational inertia, and thus the stability, of a conventional drill bit is small for its mass: the mass is all located very close to the axis of rotation. By the same token, as shown, the addition of the wider, flywheel portion 20 increases angular momentum exponentially. It is believed that the rotational inertia of flywheel portion 20 should be at least half the rotational inertia of shaft 12 to achieve a significant stabilizing effect.

To further increase tool bit stability, a wide chuck mounting end 24, see FIGS. 2 through 8, preferably fits into a correspondingly wide chuck 30 opening. See FIG. 9. In this instance, end 24 preferably has a square cross-section and has a groove 32 which slides into the chuck 30 opening and receives cammed locking balls. The square cross-section assures that the end 24 will not slip in the chuck 30 opening. This is important because mounting end 24 slipping can be the first step toward shaft 12 breakage. The cammed ball engagement type of tool bit is known in the art, and is illustrated in U.S. Pat. No. 5,062,749, issued to Sheets on Nov. 5, 1991, and in U.S. Pat. No. 4,900,202, issued to Wienhold on Feb. 13, 1990. However, for the present invention, end 24 is preferably wide in proportion to the diameter of shaft 12, unlike the apparatus of Sheets. The large surface area of end 24 resulting from the increased width helps make the bit 10 engagement more solid.

Wide chuck mounting end 24 adds stability to tool bit 10 in at least two ways. First, the wide radial distribution of its mass permits mounting end 24 to itself act as a flywheel. In this way, mounting end 24 adds stability according to the above-recited physical principles.

Second, and no less important, is the geometric benefit of having the cammed locking balls engage groove 32 at a significant distance beyond the radius of shaft 12. Although it is preferred that tool bit 10 and chuck 30 be manufactured with reasonably close tolerances, a certain amount of play between groove 32 and the cammed locking balls may be present. This play may result from limitations of the tolerances themselves or from prolonged use and wear, or simply from heavy stresses created by certain work applications. This play would permit groove 32 to move a certain axial distance D with respect to the adjacent portions of chuck 30. The closer this axial distance D is to the axis L of rotation of tool bit 10, the greater will be the angle over which axis L resultingly tilts. By making mounting end 24 substantially wider than shaft 12, the angle over which axis L tilts when groove 32 moves distance D is significantly reduced. Limiting the potential tilting angle of axis L of tool bit 10 goes to the very essence of adding stability to tool bit 10. The radially distant grip of chuck 30 on mounting end 24 also provides the mechanical advantage of increased leverage. The width of mounting end 24 and the corresponding chuck 30 opening increases in stages as shank 12 diameters increase. It is preferred that mounting end 24 have a given width for shanks 12 having diameters of one-sixteenth up to one-quarter inch. Mounting end 24 preferably has a greater given width for shanks 12 having diameters of one-quarter up to three-eighths inch, and a still greater given width for shanks 12 having diameters of three-eighths to one-half inch.

Another important stabilizing factor is the structural unification of tool bit 10. Shaft 12, flywheel portion 20 and mounting end 24 are all joined together as a single unified piece, such as by welding them together or by molding and machining as from a single piece of metal, identified in the claims by the term "monolithic". The preferred weld is a silver soldier weld, although other welds are also considered suitable. The unified structure creates much greater stiffness between the shaft 12, flywheel portion 20 and mounting end 24. Stability is gained when lateral vibration of shaft 12 is reduced. The amplitude of vibration is represented by the equation:

$$X = F_o/K \times (D.M.F.)$$

where X is the amplitude of vibration, $F_o$ is the magnitude of the loading, K is the system stiffness, and D.M.F. is a dynamic magnification factor which depends on the frequency of the loading. Although this equation is derived for a simple type of loading, it holds more generally for complex loadings as well, such as would be experienced in drilling. These more complex loadings can be considered as a summation of loadings, such as that used in deriving the above equation. For a structure such as tool bit 10, K is larger where there are no flexible joints, and as a result, vibration is reduced.

This unified structure distinguishes the present invention from much of the prior art. In prior art tool bits such as those of Seibert and Koster, the shaft is either screwed or glued into an adaptor base. As a result these prior designs are merely composite structures which have substantially less stiffness in the joint between the tool shank and the adaptor base. A layer of glue such as an adhesive can deform much more readily than can a metal weld, permitting lateral movement between the tool and the adaptor base. A screw engagement of mating internal and external threads permits some lateral sliding action between adjacent threads, once again permitting lateral relative movement and diminishing tool bit stiffness.

For a discussion of relevant vibration theory, see: Theory of Vibration with Applications, second edition, by Professor William Thomson of the University of California at Santa Barbara.

SECOND PREFERRED EMBODIMENT

Prototype testing has shown that stability is further increased by not only having a wide engaging end 24, but also by including an axial, circular bore 40 in end 24 and providing stabilizing balls 42 within bore 40. See FIG. 10. Cylinders 42 may be equivalently substituted for balls 42. See FIG. 10a. Bore 40 is closed at the tip of end 24 with a layer of weld material forming an end wall 44. It is preferred that balls 42 have a diameter just slightly smaller than that of bore 40, so that they roll freely within bore 40. Balls 42 ride on one side of the cylindrical, inner wall 46 of bore 40, and resist movement of wall 46 against balls 42, because this would shift the axis of their rotation. Should end 24 wobble in the opposite direction, the close tolerance between wall 46 and balls 42 causes balls 42 to quickly make contact with wall 46 and resist further lateral movement.

Prototype testing has shown that a bore 40 which displaces a volume of bit 10 material having a mass equal to about half of the mass of end 24, gives satisfactory performance. Balls 42 having a combined mass equal to half the mass of the displaced bit 10 material have also proven satisfactory. Three balls 42 have worked well. See FIG. 10. These prototype characteristics are merely exemplary, and should not be construed as limiting.

Figure 12:
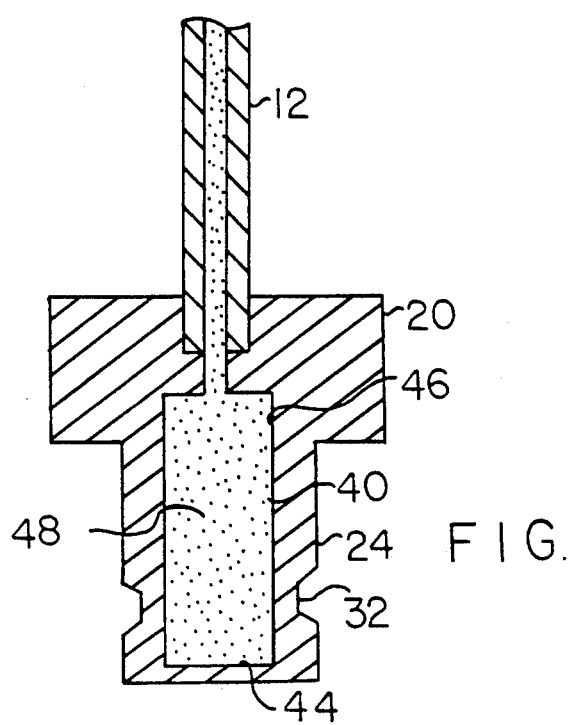
FIG. 12 is a cross-sectional side view as in FIG. 10, illustrating the internal fluid option.
Figure 13:
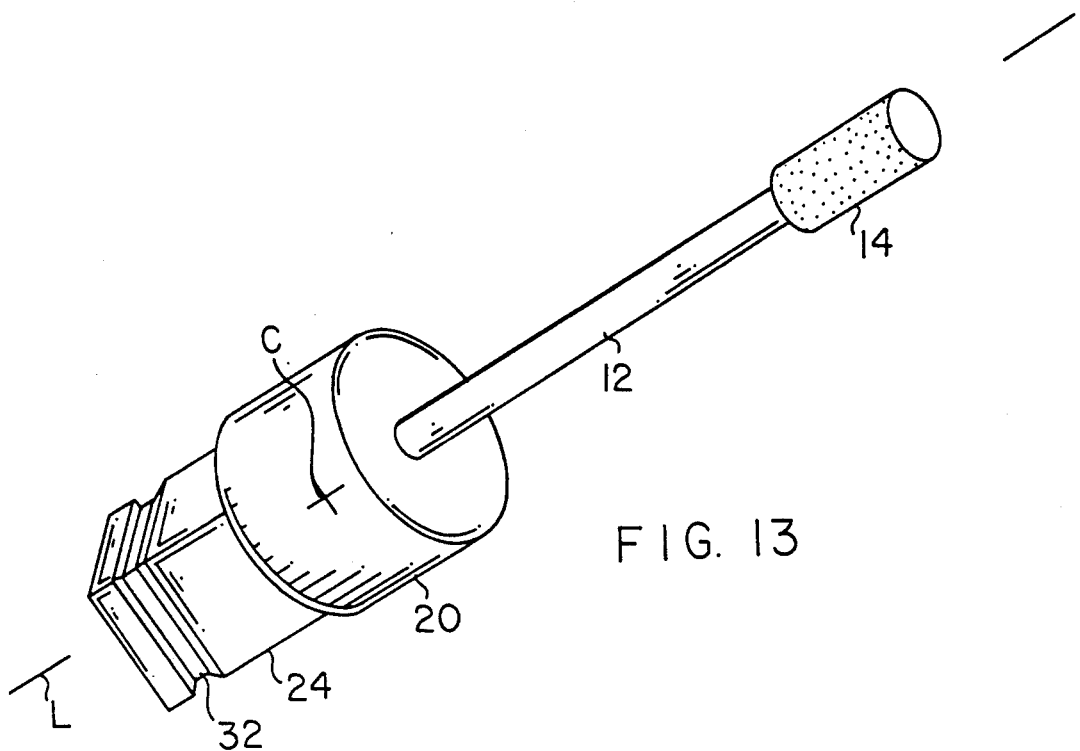
FIG. 13 is a perspective view of the inventive tool bit as in FIG. 2, except that the working end forms a circular cylinder having a circumferential abrading surface.
Figure 14:
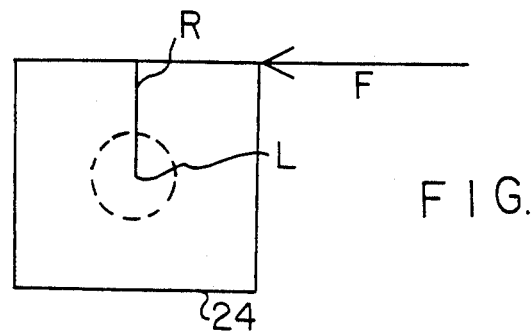
FIG. 14 is a bottom end view of a tool bit wide mounting end showing the increased radius "r" acted upon by the force "F" imparted by the chuck opening inner faces during rotational loading of said tool bit. The relative diameter of the shank or shaft middle portion is shown in broken lines.

Another stability increasing variation of tool bit 10 includes bore 40 of the previous embodiment. Shaft 12 also may include a bore along its axis as a continuation of bore 40. Bore 40 is filled with a fluid 48, preferably a liquid lubricant, and sealed closed. See FIG. 12. Fluid 48 can have two functions. The first function is to draw heat away from the metal exterior of shaft 12. For this purpose, a fluid 48 substance is selected to have a high heat storage capacity, which is a characteristic related to the specific heat of the fluid. It is believed that some solid and gaseous substances are also capable of performing this heat absorbing function. Prototype testing has shown that an internal fluid 48 also functions to increase rotational stability, as do the internal balls 42 discussed above.

PREFERRED CHUCK DESIGN

Figure 11:
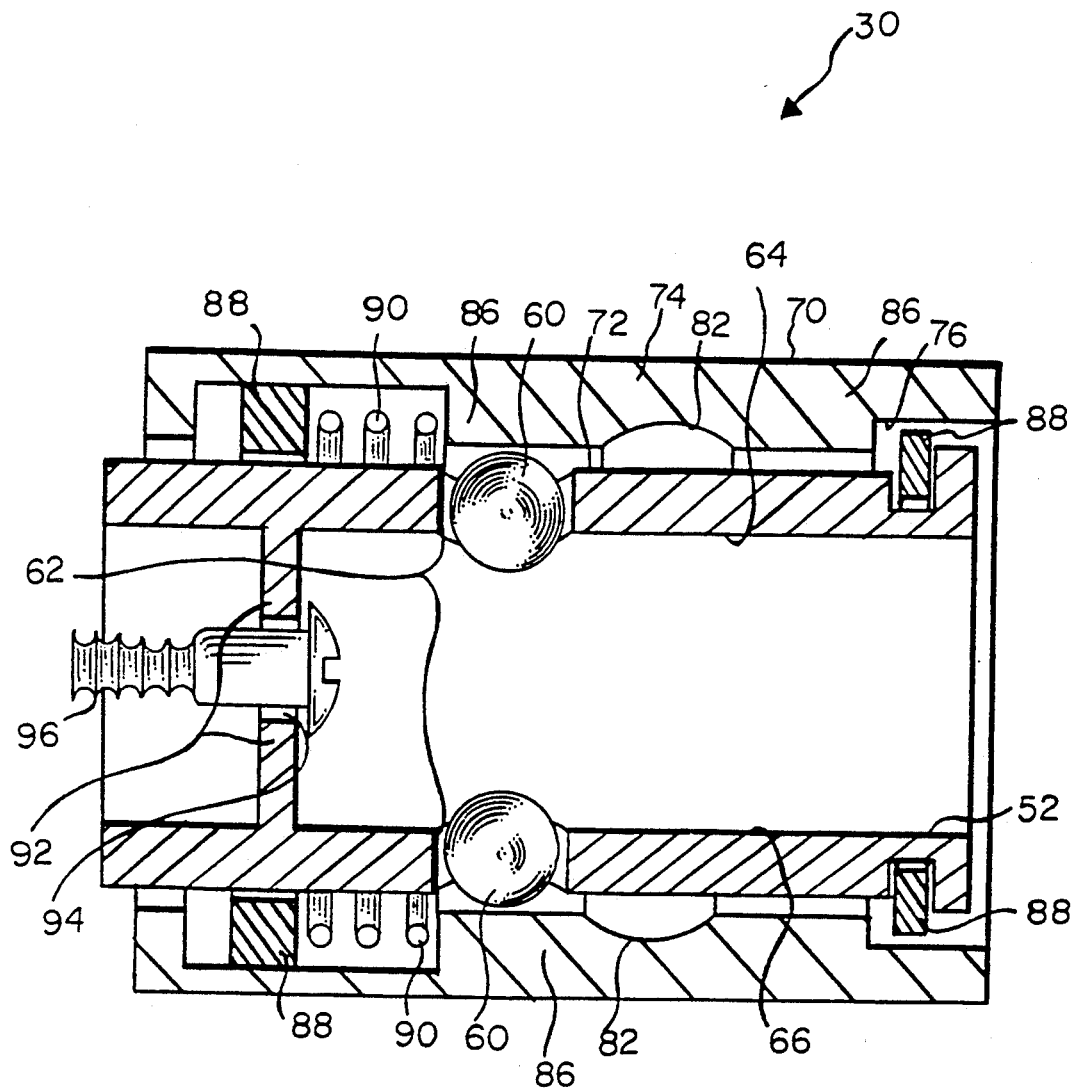
FIG. 11 is a cross-sectional side view of the inventive mounting chuck.

The preferred chuck 30 design is illustrated in FIG. 9 and in the cross-sectional side view of FIG. 11. Chuck 30 has a square, bit receiving tube 52, into which tool bit end 24 is inserted. A port 62 for loosely receiving a locking ball 60 is provided in opposing tube 52 sides 64 and 66. Ports 62 align with end 24 groove 32 so that balls 60 can enter grooves 32. A camming tube 70 is provided which slides over the outer wall 72 of tube 52, and has a camming portion 74 protruding from its inner wall 76. Camming portion 74 has a central recess 82 into which balls 60 can move so that, when recess 82 aligns with ports 62, balls 60 can roll out of grooves 32, releasing bit end 24. The shoulders 86 of camming portion 74 on either side of recesses 82 force balls 60 to protrude beyond inner wall 84 and into groove 32 to lock bit end 24 into chuck 30, when a shoulder 86 is aligned with ports 62. A coil spring 90 preferably biases tube 70 axially outward so that a shoulder 86 aligns with ports 62, which is the tool bit 10 engaging position. Retaining rings 88 are secured around tube 52 on either side of camming portion 74. Rings 88 permit limited relative sliding movement between tube 52 and tube 70, but prevent tubes 52 and 70 from sliding apart. A wall 92 is provided at the mounting end of chuck 30 having a bore 94 through which a mounting screw 96 is fitted for attaching chuck 30 to an appliance such as a drill.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A tool bit comprising:
   a shaft portion having a mounting end for insertion into a bit receiving opening of a chuck, having a working end and having an average radius and a longitudinal axis,
   a flywheel portion, between said mounting end and said working end, having an average radius greater than said average radius of said shaft portion and greater than the average radius of said receiving opening of said chuck, and having a center of gravity, said flywheel portion being positioned relative to said shaft portion such that said flywheel portion center of gravity is located substantially on said shaft portion longitudinal axis,
   said shaft portion, said mounting end and said flywheel portion being elements of a single monolithic structure.

2. A tool bit according to claim 1, wherein said flywheel portion has a certain rotational inertia which is at least half the rotational inertia of said shaft portion, so that the resulting increase in angular momentum is significant.

3. A tool bit according to claim 1, wherein said working end comprises a drill cutting edge.

4. A tool bit according to claim 1, wherein said working end comprises a screw driver flat head.

5. A tool bit according to claim 1, wherein said working end comprises a screw driver cross-shaped, pointed tip head.

6. A tool bit according to claim 1, wherein said working end comprises a socket mounting head.

7. A tool bit according to claim 1, wherein said working end comprises an abrading surface.

8. A tool bit according to claim 1, wherein said mounting end is square in longitudinal cross-section for mounting in a square receiving port of a chuck, for preventing rotational movement of said tool bit relative to said chuck.

9. A tool bit according to claim 1, wherein said mounting end comprises a depression for engagement by a cammed engaging member in a drill chuck receiving port.

10. A tool bit according to claim 1, wherein said mounting end has an average radius which is at least twice said average radius of said shaft portion, for increased tool bit stability.

11. A tool bit according to claim 10, wherein said mounting end comprises:
a bore coaxial with said longitudinal axis of said shaft portion,
at least one stabilizing ball contained within said bore, said at least one stabilizing ball having a diameter less than that of said bore to permit relative movement between said at least one stabilizing ball and said mounting end,
retaining means for preventing escape of said at least one stabilizing ball from said bore.

12. A tool bit according to claim 10, wherein said mounting end comprises:
a bore coaxial with said longitudinal axis of said shaft portion,
at least one rounded stabilizing member contained within said bore, said at least one stabilizing member having a diameter less than that of said bore to permit relative movement between said at least one stabilizing member and said mounting end,
retaining means for preventing escape of said at least one stabilizing member from said bore.

13. A tool bit according to claim 11, wherein three said stabilizing balls are contained within said bore.

14. A tool bit according to claim 13, wherein the volume of said bore is essentially half the volume of said mounting end.

15. A tool bit according to claim 14, wherein the combined volumes of said stabilizing balls is essentially half the volume of said bore.

16. A chuck in combination with and for receiving a tool bit as in claim 9, comprising:
a receiving tube for receiving said mounting end of said tool bit,
a port in said receiving tube for laterally receiving a locking ball, such that said port can align with said depression so that said locking ball can enter said depression,
a camming tube having an inner wall and slidably mounted over said receiving tube, comprising a camming portion protruding from said inner wall and comprising a central camming portion recess into which said locking ball can move so that, when said recess aligns with said port, said locking ball can roll out of said depression and into said recess, thereby releasing said tool bit mounting end, said camming portion also comprising a shoulder on one side of said recess for forcing said locking ball to protrude through said port and into said depression to lock said tool bit mounting end into said chuck, when said shoulder is aligned with said port.

17. A chuck assembly according to claim 16, additionally comprising:
biasing means for biasing said camming tube in a position wherein said shoulder is aligned with said port.

18. A tool bit comprising:

a shaft portion having a mounting end and a working end and a middle segment connecting said mounting end and said working end, said middle segment having an average radius and a longitudinal axis,
wherein said mounting end has an average radius which is at least twice said average radius of said middle segment, for enhanced tool bit stability,
and wherein said mounting end comprises a lateral chuck engaging surface adapted to abut during rotational loading of said tool bit a corresponding lateral tool bit engaging surface within a power tool chuck, and to abut said tool bit engaging surface at a distance from said shaft portion longitudinal axis of at least twice said average radius of said middle segment such that said chuck engaging surface lockingly abuts said tool bit engaging surface with a substantial moment, to resist mounting end stripping and slipping, and to further enhance tool bit rotational stability.

19. A tool bit according to claim 18, wherein said mounting end comprises:
a bore coaxial with said longitudinal axis of said shaft portion,
at least one stabilizing ball contained within said bore, said at least one stabilizing ball having a diameter less than that of said bore to permit relative movement between said at least one stabilizing ball and said mounting end,
retaining means for preventing escape of said at least one stabilizing ball from said bore.

20. A tool bit according to claim 18, wherein said mounting end comprises:
a bore coaxial with said longitudinal axis of said shaft portion,
at least one stabilizing cylinder contained within said bore, said at least one stabilizing cylinder having a diameter less than that of said bore to permit relative movement between said at least one stabilizing cylinder and said mounting end,
retaining means for preventing escape of said at least one stabilizing cylinder from said bore.

21. A tool bit according to claim 18, wherein said mounting end comprises:
a bore coaxial with said longitudinal axis of said shaft portion,
fluid contained within said bore,
retaining means for preventing escape of said fluid from said bore.

22. A tool bit comprising:
a shaft portion having a mounting end, having a working end and having an average radius and a longitudinal axis,
wherein said mounting end comprises a bore coaxial with said longitudinal axis of said shaft portion, at least one stabilizing ball contained within said bore, said at least one stabilizing ball having a diameter less than that of said bore to permit relative movement between said at least one stabilizing ball and said mounting end, and retaining means for preventing escape of said at least one stabilizing ball from said bore.

23. A tool bit comprising:
a shaft portion having a mounting end, having a working end and having an average radius and a longitudinal axis,
wherein said mounting end comprises a bore coaxial with said longitudinal axis of said shaft portion, at least one cylindrical stabilizing member contained within said bore, said at least one stabilizing member having a diameter less than that of said bore to permit relative movement between said at least one stabilizing member and said mounting end, retaining means for preventing escape of said at least one stabilizing member from said bore.

24. A tool bit according to claim 22, wherein three said stabilizing balls are contained within said bore.

25. A tool bit according to claim 24, wherein the volume of said bore is essentially half the volume of said mounting end.

26. A tool bit according to claim 25, wherein the combined volumes of said stabilizing balls is essentially half the volume of said bore.

27. A tool bit according to claim 18, additionally comprising:
an axial bore in said shaft portion
a substance contained within said axial bore for drawing heat away from the exterior of said shaft portion,
means for retaining said substance within said axial bore.

28. A tool bit comprising:
a shaft portion having a mounting end and a working end and a middle segment connecting said mounting end and said working end,
an axial bore in said shaft portion
a substance contained within said axial bore for drawing heat away from the exterior of said shaft portion,
means for retaining said substance within said axial bore.

29. The tool bit of claim 18, wherein said chuck engaging surface comprises a substantially planar lateral face and said tool bit engaging surface within said chuck also comprises a substantially planar lateral face.

30. A tool bit comprising:
a shaft portion having a mounting end and a working end and a middle segment connecting said mounting end and said working end, said middle segment having a average radius and a longitudinal axis,
wherein said mounting end has an average radius which is at least three times said average radius of said middle segment, for enhanced tool bit stability,
and wherein said mounting end comprises a lateral chuck engaging surface adapted to abut during rotational loading of said tool bit a corresponding lateral tool bit engaging surface within a power tool chuck, and to abut said tool bit engaging surface at a distance from said shaft portion longitudinal axis of at least three times said average radius of said middle segment such that said chuck engaging surface lockingly abuts said tool bit engaging surface with a substantial moment, to resist mounting end stripping and slipping, and to further enhance tool bit rotational stability,
wherein said chuck engaging surface comprises a substantially planar lateral face and said tool bit engaging surface within said chuck also comprises a substantially planar lateral face.

31. A tool bit comprising:
a shaft portion having a mounting end and a working end and a middle segment connecting said mounting end and said working end, said middle segment having an average radius and a longitudinal axis,
wherein said mounting end has an average radius which is at least four times said average radius of said middle segment, for enhanced tool bit stability,
and wherein said mounting end comprises a lateral chuck engaging surface adapted to abut during rotational loading of said tool bit a corresponding lateral tool bit engaging surface within a power tool chuck, and to abut said tool bit engaging surface at a distance from said shaft portion longitudinal axis of at least four times said average radius of said middle segment such that said chuck engaging surface lockingly abuts said tool bit engaging surface with a substantial moment, to resist mounting end stripping and slipping, and to further enhance tool bit rotational stability,
wherein said chuck engaging surface comprises a substantially planar lateral face and said tool bit engaging surface within said chuck also comprises a substantially planar lateral face.

* * * * *